United States Patent Office 3,223,750
Patented Dec. 14, 1965

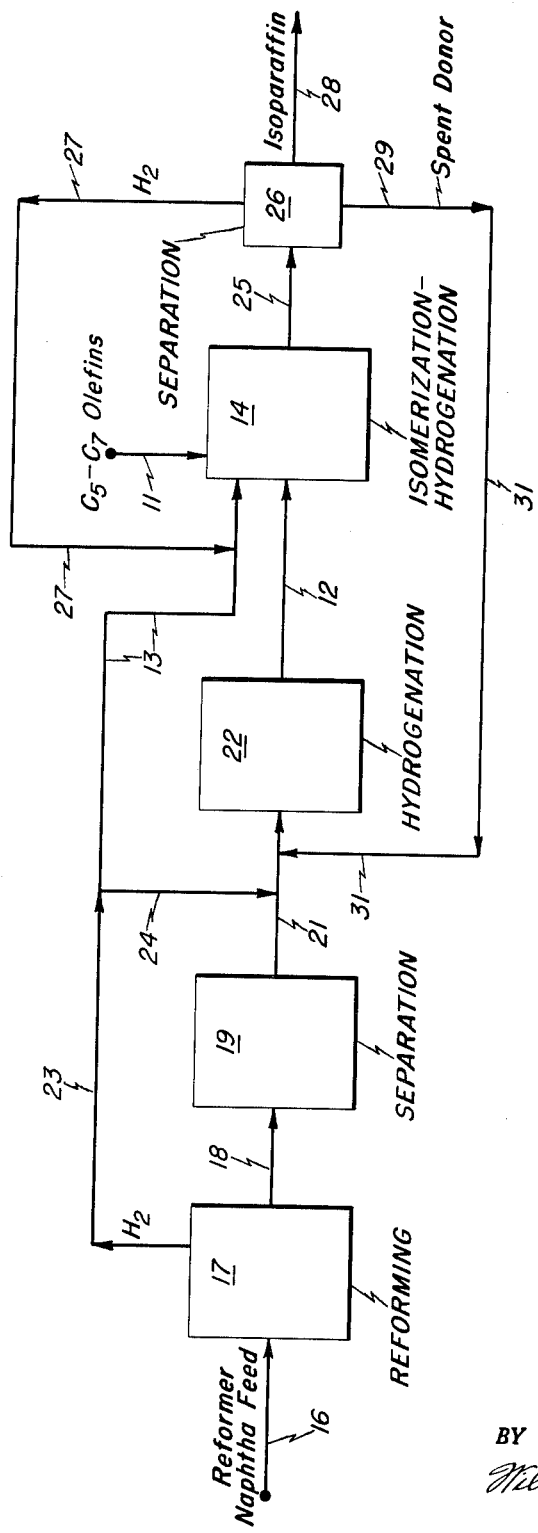
INVENTORS:
Bernard L. Evering
Samuel W. Harris
BY
ATTORNEY

3,223,750
HYDROCARBON CONVERSION PROCESS
Samuel W. Harris and Bernard L. Evering, both of Chicago, Ill., assignors to Standard Oil Company, Chicago, Ill., a corporation of Indiana
Filed June 26, 1961, Ser. No. 119,375
14 Claims. (Cl. 260—683.65)

This invention relates to hydrogen transfer, and more particularly it relates to the conversion of straight-chain olefinic hydrocarbons to more branched paraffinic hydrocarbons. In one aspect, this invention relates to converting straight-chain olefins is isoparaffins by a hydrogen transfer reaction wherein a particularly well-suited fraction of reformate from a catalytic hydroformer is employed as the hydrogen donor.

Light isoparaffins are desirable components for blending into gasoline, because of the desirable octane rating of the isoparaffins. Such isoparaffins have markedly higher octane ratings than either the corresponding normal paraffins or olefins of the corresponding numbers. Consequently, there is a definite advantage for converting light normal olefins to the corresponding isoparaffins.

Various hydrocarbon compounds are known which contain combined hydrogen in a labile state at elevated temperatures, and many of these compounds are well-suited for use as a hydrogen donor in a hydrogen transfer reaction. If an unsaturated hydrocarbon is heated in the presence of a hydrogen donor under suitable temperature and pressure conditions, the labile combined hydrogen is transferred from the hydrogen donor to the unsaturated material which results in the saturation of the unsaturate.

In conventional hydrogen transfer reaction several factors have adverse effects upon the operation and economics of the process. For example, in known hydrogen transfer operations the catalyst used therein tends to rapidly become deactivated due to the formation of carbonaceous materials thereon, and it is difficult to attain a satisfactorily high degree of saturation. Generally speaking, decahydronaphthalenes and tetrahydronaphthalenes, as well as other satisfactory hydrogen donors, are expensive, and it is desirable to have available a refinery stream providing an economical source of hydrogen donor.

Briefly, according to the present invention, a hydrogen transfer reaction is carried out in the presence of a hydrogen-affording gas to increase the on-stream time and to obtain a more fully saturated product.

In one aspect, the invention provides a combination process wherein normal olefinic hydrocarbons having from 5 to 7 carbon atoms per molecule are converted to isoparaffins by contacting them with a hydrogen donor in the presence of a solid acidic catalyst under hydrogen transfer conditions, the conversion being carried out in the presence of a hydrogen-affording gas at superatmospheric pressure. The hydrogen donor is provided by hydroforming a hydrocarbon naphtha over a platinum-type reforming catalyst in the presence of hydrogen, separating the resulting reformate into a hydrogen-rich gas fraction and a 410°–520° F. aromatics-rich fraction, partially hydrogenating the aromatics-rich fraction and employing the hydrogenated fraction as the hydrogen donor; preferably, with at least a portion of the hydrogen-rich gas fraction being employed as the hydrogen-affording gas in the hydrogen transfer zone. Further, the process includes the separation of the effluent from the hydrogen transfer zone into at least a hydrogen-rich gas fraction which may be employed as recycle hydrogen, a light isoparaffinic fraction having a high ratio of isoparaffins to normal paraffins, and a spent hydrogen donor fraction which is returned to the hydrogenation zone wherein it is regenerated by partially saturating the unsatured spent hydrogen donor, with the regenerated donor being recycled to the hydrogen transfer zone.

The olefinic hydrocarbon selected as a feedstock for the present process may be any of several refinery streams containing substantial amounts of unsaturates. Advantageously, light cracked naphthas, such as catalytically cracked debutanized absorption naphtha, is utilized. Typically, such a catalytic naphtha has an ASTM distillation ranging from about 75° F. I.B.P. to about 340° F. E.P., and contains about 34 percent $C_5$'s, 28 percent $C_6$'s and 17 percent $C_7$'s, and is comprised of about 54 percent olefins. The hydrogen donor employed in the process may be any of the known hydrogen donor materials such as tetrahydronaphthalene, decahydronaphthalene, alkyl substituted tetrahydronaphthalenes and decahydronaphthalenes, hydrogenated anthracene and the like. Advantageously, however, the hereindescribed partially saturated reformate fraction is employed as the hydrogen donor.

A better understanding of the present invention will be had by a reading of the following description of the invention and by reference to the accompanying drawing which is a diagrammatic illustration of a preferred embodiment of the present invention. It is to be understood that the following description and examples are given for illustrative purposes only and that various modifications thereof will become apparent to the skilled artisan from a reading of the description, which modifications fall within the spirit and scope of the present invention.

Referring to the drawing, a catalytic debutanized absorption naphtha feedstock is passed by way of line 11, together with a hydrogen donor by way of line 12 and a hydrogen-affording gas by way of line 13 to a reactor 14 containing a bed of a solid acidic catalyst, preferably silica-alumina. The reactor 14 is maintained under hydrogen transfer conditions which includes a temperature in the range of 450–800° F., preferably between about 500–700° F. and a pressure ranging from atmospheric to about 500 p.s.i.g., preferably between about 25–150 p.s.i.g. The liquid hourly space velocity of the total hydrocarbon charge will vary between about 0.1 and 5.0 volumes of feed per hour per volume of catalyst, and preferably is between about 1 to 2. In addition to the silica-alumina catalyst in reactor 14 other acidic catalysts which are stable under the operating conditions of the hydrogen transfer zone may also be used. These catalysts include fluorided alumina, alumina impregnated with aluminum chloride, boria-alumina, silica-magnesia, silica-alumina - zirconia and the heteropoly acid treated aluminas, i.e., aluminas treated iwth phosphotungstic acid, phosphovanadic acid, silico-tungstic acid, etc. A preferred catalyst is one of the commercially available synthetic silica-alumina cracking catalysts. The preparation and properties of the acidic catalysts are well-known in the art and they need not be described further herein for the purpose of the present invention. For example, see the series entitled "Catalysis" by Emmett (Reinhold Publishing Corporation), particularly volume VII, pp. 1–91.

The preferred hydrogen donor is prepared by hydroforming a $C_7+$ naphtha reforming charge which typically boils in the range of about 200–400° F. and contains about 51 percent paraffins, 42 percent naphthenes and 7 percent aromatics. The naphtha charge is passed by way of line 16 to a hydroformer, which preferably is a regenerative platinum-alumina catalyst reforming system of the type described in U.S. Patent 2,773,014, employing 3 conventional reactors and a "swing" reactor to effect cyclic regeneration of the catalyst. Typically, the reforming catalyst contains about 0.1 to 1 weight percent platinum on gamma alumina prepared by the method taught in U.S. Patent Reissue 22,196, but other similar reforming catalysts may be employed. Since the preparation of the catalyst does not form a part of the present invention, variations thereof will not be described in further detail herein. The reforming conditions preferably include a catalyst temperature between about 850–1000° F., a hydrogen pressure between about 250 and 400 p.s.i.g., a hydrogen to hydrocarbon ratio of about 2000 and 5000 standard cubic feet of hydrogen per barrel of naphtha charge, and the charge is introduced into the reforming reactor system to maintain a space velocity between 1 and 5 pounds of hydrocarbon per hour per pound of catalyst. The total reformate is withdrawn from the last reactor of the reforming zone 17, after which it is condensed and the dry gases separated therefrom in a high pressure separator (not shown). The separated dry gases are rich in hydrogen and typically, contain about 70 percent hydrogen. Subsequently, an aromatics-rich reformate fraction boiling between about 410° F. and 520° F. is separated from the remaining liquid reformate which is passed by way of line 18 to the separation zone 19 wherein the liquid reformate is distilled to provide the desired fractionation. The aromatics-rich reformate fraction contains chiefly naphthalene, methyl and dimethyl naphthalenes. The 410–520° F. cut of the reformate is passed by way of line 21 to a hydrogenation zone 22 containing a bed of hydrogenation catalyst, such as platinum, nickel, or other well-known hydrogenation active catalyst, particularly cobalt-molybdena or alumina. The aromatics-rich reformate fraction is contacted in the hydrogenation zone with the hydrogenation catalyst in the presence of hydrogen, at least a portion of which is preferably supplied by way of lines 23 and 24 from the reforming zone 17. Advantageously, the hydrogenation conditions in reactor 22 when employing cobalt-molybdena on alumina catalyst include a temperature in the range of about 700° F. to 800° F., a pressure in the range of about 500 p.s.i.g. to 1200 p.s.i.g., a liquid hourly space velocity between about 2 and 4 volumes of oil per hour per volume of catalyst, and a hydrogen to hydrocarbon ratio between about 2000 and 10,000 standard cubic feet of hydrogen per barrel of feed. The effluent from the hydrogenation reactor then contains hydrogenated polycyclic compounds and the conditions in hydrogenation reactor 22 are controlled to provide a partially saturated product containing chiefly tetrahydronaphthalene, methyl and dimethyl tetrahydronaphthalenes. The hydrogenated material is then passed by way of line 12 to the reactor 14 wherein it is employed as the hydrogen donor in the hydrogen transfer reaction. The hydrogen donor is introduced into the reactor 14 at a rate high enough to provide olefin saturation. A low ratio of hydrogen donor to olefins may be used, with the rate being high enough to prevent too high a rate of coking on the catalyst. The upper limit of the hydrogen donor to olefin ratio is limited only by the amount of product desired from the process. Broadly, a hydrogen donor-to-olefin ratio between about 0.5 and 5 moles of hydrogen donor per mole of olefin may be used, and, typically, between about 1 and 3 moles of hydrogen donor per mole of olefin is used. Preferably, a hydrogen donor to olefin ratio of about 2 parts hydrogen donor to 1 part olefin is employed.

At least a portion of the hydrogen required in the hydrogen transfer reactor is supplied from the reformer 17 by way of lines 23 and 13 and the hydrogen to feed ratio will vary between about 0.1 and 10 moles of hydrogen per mole of feed, and preferably is between about 0.5 and 2.

The effluent from the hydrogen transfer reactor 14 is essentially saturated and contains a high ratio of isoparaffins to normal paraffins, which ratio is greater than the thermodynamic equilibrium ratio for the conversion of paraffins to isoparaffins at the operating temperature. The hydrogen transfer reactor effluent is then passed by way of line 25 to a separation zone 26 which may be a fractionator wherein a hydrogen-rich gas fraction is distilled therefrom and recycled by way of line 27 to the hydrogen transfer zone 14. The isoparaffinic light fraction is withdrawn by way of line 28 and may be further treated if desired and blended into a high octane gasoline. Typically, the isoparaffinic product has an iso to normal $C_5$ paraffin ratio of about 10 to 1, and the motor octane rating (3 cc.'s lead) of the $C_5$ portion is found to be about 103 CFR-M.

A heavy fraction rich in spent hydrogen donor and containing primarily naphthalenes is withdrawn as a bottoms product from the fractionator via line 29 and recycled by way of line 31 to the hydrogenation zone 22 wherein it is regenerated to provide a more saturated stream which can be employed again as the hydrogen donor in the hydrogen transfer zone 14.

The present invention is further illustrated by the following examples wherein a $C_5$ fraction from a catalytic debutanized absorption naphtha is employed as a feedstock. A comparison test, wherein no hydrogen was employed in the hydrogen transfer reaction, is included to illustrate the superior performance which is obtained by employing hydrogen pressure in the hydrogen transfer reaction.

COMPARISON TEST

A charge stock comprising 58.9 percent tetralin and 41.1 percent of a $C_5$ fraction of a catalytic debutanized absorption naphtha was contacted at atmospheric pressure and an average temperature of 710° F. with a silica-alumina cracking catalyst. The liquid hourly space velocity was 1.2 volumes of total charge per hour per volume of catalyst and the space velocity of the $C_5$ feed was about 0.6 volume of feed per hour per volume of catalyst. The effluent from the reactor was analyzed and found to contain the following:

| Product analysis: | Weight percent |
|---|---|
| $C_4H_{10}$ | 1.4 |
| $C_4H_8$ | 0.6 |
| Isopentane | 64.1 |
| n-Pentane | 7.5 |
| 1-pentene | 1.2 |
| 2-methyl-1-butane | 4.3 |
| 2-pentene | 6.3 |
| 2-methyl-2-butene | 10.8 |
| Total olefin | 21.2 |

The RM octane rating, i.e., $$\frac{Research + Motor}{2}$$

of the effluent was found to be 99.5 (3 cc.'s lead).

*Example I*

A charge stock having the same composition as indicated above in the Comparison Test was contacted with a silica-alumina cracking catalyst under the same conditions as the Comparison Test, except that a hydrogen pressure of 120 p.s.i.g. was maintained during the run. The product had an iso to normal $C_5$ paraffin ratio of 9:1 and about 3.3 percent olefins appeared in the effluent. The RM octane rating was 103 (3 cc.'s lead).

*Example II*

A charge stock was prepared as described above with the same feed to hydrogen donor ratio. The charge stock was contacted with a silica-alumina catalyst in the presence of hydrogen at 102 p.s.i.g., at a temperature which varied from 691° F. to 706° F. and at a space velocity of 1.2 volumes of feed per hour per volume of catalyst. The effluent from the reactor was analyzed and found to contain the following constituents:

| Product analysis: | Weight percent |
|---|---|
| $C_4H_{10}$ | 1.3 |
| $C_4H_8$ | --- |
| Isopentane | 82.9 |
| n-Pentane | 9.3 |

Product analysis—Continued Weight percent
    C₆+ ----------------------------------- 5.9
    1-pentene ----------------------------- T
    2-methyl-1-butene --------------------- 0.1
    2-pentene ----------------------------- 0.4
    2-methyl-2-butene --------------------- 0.05
    Total olefin -------------------------- 0.6

From the foregoing it is seen that the above-described process is capable of converting normal olefins to isoparaffins in high yields and that there is a good selectivity for this conversion.

What we claim is:

1. A hydrogen transfer process for the production of branched-chain paraffinic hydrocarbons, which process comprises contacting a hydrocarbon feed containing a substantial amount of a normal olefin having from 5 to 7 carbon atoms per molecule with a hydrogen donor in the presence of a solid acidic isomerization catalyst and an added hydrogen-affording gas in a hydrogen transfer reaction zone under hydrogen transfer conditions; said hydrogen donor comprising a hydrocarbon containing labile combined hydrogen effective to hydrogenate said olefin under the process conditions and being present in an amount between about 0.5 and 5 moles per mole of said olefin; and recovering the resulting isoparaffinic product having a high ratio of isoparaffins to normal paraffins.

2. The process of claim 1 wherein said hydrogen donor comprises a hydrogenated polycyclic hydrocarbon.

3. The process of claim 1 wherein said feed is a light cracked naphtha and said hydrogen donor is selected from the group consisting of decahydronaphthalenes and tetrahydronaphthalenes derived from a hydroformed naphtha.

4. The process of claim 1 wherein said hydrogen transfer conditions include a pressure between about atmospheric pressure and 500 p.s.i.g. and a hydrogen to feed ratio of between about 0.1 and 10 moles of hydrogen per mole of feed.

5. The process of claim 1 wherein said hydrogen transfer conditions include a pressure between about 25 and 150 p.s.i.g. and a hydrogen to feed ratio of between about 0.5 and 2 moles of hydrogen per mole of feed.

6. The process of claim 1 wherein said catalyst is a silica-alumina cracking catalyst.

7. The process of claim 1 wherein said conditions include a temperature between about 450° F. and 800° F., a pressure between about atmospheric and 500 p.s.i.g., a liquid hourly space velocity between about 0.1 and 5 volumes of total charge per hour per volume of catalyst, a hydrogen donor to feed ratio between about 0.5 and 5 moles of donor per mole of olefin and a hydrogen to feed ratio between about 0.1 and 10 moles of hydrogen per mole of feed.

8. The process of claim 1 wherein said hydrogen donor is prepared by hydroforming a hydrocarbon naphtha over a platinum-type catalyst in the presence of hydrogen, separating an aromatics-rich 410–520° F. fraction from the resulting reformate, and hydrogenating said fraction.

9. The process of claim 8 wherein at least a part of said hydrogen employed in said hydrogen-transfer step is supplied from said hydroforming step.

10. The process of claim 1 wherein said conditions include a temperature between about 500° F. and 700° F., a pressure between about 25 and 150 p.s.i.g., a liquid hourly space velocity between about 1 and 2 volumes of total charge per hour per volume of catalyst, a hydrogen donor to feed ratio between about 1 and 3 moles of donor per mole of feed and a hydrogen to feed ratio between about 0.5 and 2 moles of hydrogen per mole of feed.

11. The process of claim 1 wherein spent hydrogen donor is separated from the effluent from said hydrogen transfer step, contacted with a hydrogenation catalyst in the present of hydrogen under hydrogenation conditions, and the resulting hydrogenated donor is recycled to said hydrogen transfer zone.

12. The process of claim 11 wherein spent hydrogen donor is separated from the effluent from said hydrogen transfer step and contacted with a hydrogenation catalyst in the presence of at least a poortion of said hydrogen-rich gas from said hydroforming step under hydrogenation conditions to hydrogenate said spent donor, and said hydrogenated donor is recycled to said hydrogen transfer step.

13. A process for the production of branched-chain paraffinic hydrocarbons from the corresponding straight-chain olefins which process comprises contacting a light hydrocarbon naphtha containing a substantial amount of normal olefins having from 5 to 7 carbon atoms per molecule with a hydrogen donor in the presence of a solid acidic isomerization catalyst and a hydrogen-affording gas under hydrogen transfer conditions; said hydrogen donor having been prepared by hydroforming a hydrocarbon naphtha over a platinum-type reforming catalyst in the presence of hydrogen, separating the resulting reformate into a hydrogen-rich gas fraction and a 410–520° F. aromatics-rich fraction, and hydrogenating said aromatics-rich fraction to provide said hydrogen donor; at least a portion of said hydrogen-rich gas being employed as said hydrogen-affording gas.

14. The process of claim 13 wherein said solid acidic catalyst is a silica-alumina cracking catalyst and wherein said conditions include a temperature between about 500° F. and 700° F., a pressure between about 25 and 150 p.s.i.g., a liquid hourly space velocity between about 1 and 2 volumes of total charge per hour per volume of catalyst, a hydrogen donor to feed ratio between about 1 and 3 moles of donor per mole of feed and a hydrogen to feed ratio between about 0.5 and 2 moles of hydrogen per mole of feed.

References Cited by the Examiner

UNITED STATES PATENTS

| | | | |
|---|---|---|---|
| 2,400,795 | 5/1946 | Watson | 208—56 |
| 2,426,870 | 9/1947 | Hill | 260—683.9 |
| 2,472,254 | 6/1949 | Johnson | 260—683.9 |
| 2,564,964 | 8/1951 | Engle | 260—683.65 |
| 2,626,286 | 1/1953 | Voorhies et al. | 260—683.9 |
| 2,772,222 | 11/1956 | Stewart et al. | 208—56 |
| 2,943,996 | 7/1960 | Watkins | 208—145 |
| 3,149,180 | 9/1964 | Platteeuw et al. | 260—683.65 |
| 3,156,737 | 11/1964 | Gunthberlet | 260—683.65 |

ALPHONSO D. SULLIVAN, *Primary Examiner.*